US009976060B2

(12) United States Patent
Dimmer et al.

(10) Patent No.: US 9,976,060 B2
(45) Date of Patent: May 22, 2018

(54) METHOD FOR BONDING SUBSTRATES TO COLD AND DAMP SURFACES

(71) Applicant: BASF SE, Ludwigshafen (DE)

(72) Inventors: Joerg-Alexander Dimmer, Mannheim (DE); Michael Gross, Mannheim (DE); Gledison Fonseca, Mannheim (DE); Miriam Mueller, Blieskastel (DE); Anja Hubert, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 15/322,955

(22) PCT Filed: Jun. 15, 2015

(86) PCT No.: PCT/EP2015/063267
§ 371 (c)(1),
(2) Date: Dec. 29, 2016

(87) PCT Pub. No.: WO2016/000938
PCT Pub. Date: Jan. 7, 2016

(65) Prior Publication Data
US 2017/0198169 A1    Jul. 13, 2017

(30) Foreign Application Priority Data

Jul. 2, 2014 (EP) .................... 14175448

(51) Int. Cl.
*C09J 7/02* (2006.01)
*C09J 5/00* (2006.01)
*C09J 133/08* (2006.01)

(52) U.S. Cl.
CPC ............... *C09J 7/0217* (2013.01); *C09J 5/00* (2013.01); *C09J 133/08* (2013.01); *C09J 2205/114* (2013.01); *C09J 2433/00* (2013.01)

(58) Field of Classification Search
CPC ...................................... C09J 7/0217
See application file for complete search history.

(56) References Cited

U.S. PATENT DOCUMENTS

| 5,623,011 A | 4/1997 | Bernard |
| 6,927,267 B1 | 8/2005 | Varela De La Rosa et al. |
| 2010/0092774 A1* | 4/2010 | Schoecker ............ C08F 2/18 428/355 EN |

FOREIGN PATENT DOCUMENTS

| DE | 103 59 359 A1 | 7/2005 |
| EP | 0 081 083 A2 | 6/1983 |
| EP | 1 342 762 A2 | 9/2003 |
| WO | 96/05248 A1 | 2/1996 |
| WO | 2011/054719 A1 | 5/2011 |
| WO | 2013/117428 A1 | 8/2013 |

OTHER PUBLICATIONS

International Search Report dated Jul. 16, 2015 in PCT/EP2015/063267 dated Jun. 15, 2015.

* cited by examiner

*Primary Examiner* — Daniel H Lee
(74) *Attorney, Agent, or Firm* — Oblon, McClelland, Maier & Neustadt, L.L.P.

(57) ABSTRACT

A description is given of a method, and of pressure-sensitive adhesive compositions suitable therefor, for bonding a substrate to cold and damp surfaces, the surface temperature being lower than the dewpoint temperature of the air in contact with the surface, and the pressure-sensitive adhesive composition comprising a pressure-sensitive adhesive polymer formed from defined amounts of 2-ethylhexyl acrylate, monomers selected from C1 to C2 alkyl (meth)acrylates, styrene, acid monomers, and optionally further monomers, in the presence of chain transfer agents.

10 Claims, No Drawings

METHOD FOR BONDING SUBSTRATES TO COLD AND DAMP SURFACES

The invention relates to a method, and to pressure-sensitive adhesive compositions suitable therefor, for bonding a substrate to cold and damp surfaces, the surface temperature being lower than the dewpoint temperature of the air in contact with the surface, and the pressure-sensitive adhesive composition comprising a pressure-sensitive adhesive polymer formed from defined amounts of 2-ethylhexyl acrylate, monomers selected from C1 to C2 alkyl (meth) acrylates, styrene, acid monomers, and optionally further monomers, in the presence of chain transfer agents.

Pressure-sensitive adhesives (PSAs) based on aqueous polymer dispersions obtainable by emulsion polymerization are a long-established art. The polymers in question are, in particular, poly(meth)acrylates. These are generally copolymers, in which at least one of the monomers is an acrylic ester that forms polymers with a relatively low glass transition temperature, such as n-butyl acrylate or 2-ethylhexyl acrylate, for example. Known acrylate copolymers based on n-butyl acrylate do have adhesive properties sufficient at room temperature for the production of self-adhesive labels. The temperature dependence of the surface tack, however, means that the surface tack goes down significantly at lower temperatures. There is therefore a desire for pressure-sensitive adhesive polymers which retain good surface tack even at temperatures well below room temperature, especially with respect to hydrophobic surfaces such as polyethylene, for example. A particular problem arises if the surfaces not only are cold, meaning that they have a surface temperature well below room temperature, but also if the surfaces additionally are damp. Damp surfaces are formed, for example, when the surface temperature is lower than the dewpoint temperature of the moist air—that is, air containing water vapor—that is in contact with the surface. In such applications, polyacrylate-based PSAs frequently exhibit inadequate adhesion.

For this application, therefore, adhesives known as hotmelts (e.g., styrene-isoprene-styrene polymers, SIS) are often used. These hotmelts exhibit very good substrate tack to cold and damp surfaces, but have the disadvantage that because of additives they frequently contain, they do not enjoy approval under food law, and have processing viscosities that are high by comparison with dispersion-based adhesives, resulting in low coating speeds.

EP 1342762 A1 describes polymer dispersions for PSA applications within a wide temperature range. Applications on damp surfaces are not described. The polymers are based on C1 to C20 alkyl (meth)acrylates, ethylenically unsaturated carboxylic acid monomers, C2 to C8 hydroxyalkyl (meth)acrylates, and optionally further monomers.

WO 96/05248 describes PSAs with good low-temperature characteristics. Applications on damp surfaces are not described. The polymers are based on C4 to C8 alkyl acrylates, defined vinyl esters, defined dicarboxylic diesters, and defined ethylenically unsaturated carboxylic acid monomers. Copolymerization between the dicarboxylic diester monomers and standard acrylate monomers is poor.

WO 2011/054719 describes pressure-sensitive adhesives adhering well to nonpolar surfaces at low temperatures. Applications on damp surfaces are not described. The PSAs comprise pressure-sensitive adhesive polymers of n-butyl acrylate, ethyl acrylate, vinyl acetate, acid monomers, and optionally further monomers.

It was an object of the present invention to provide PSAs for use in the bonding of substrates to damp and cold surfaces, with extremely good adhesion to damp and cold surfaces, extremely high opportunities for approvals under food law, extremely low processing viscosities, and extremely high achievable coating speeds.

The method elucidated in more detail below was found in response to this object.

The invention provides a method for bonding a substrate to cold and damp surfaces, in which
(1) a pressure-sensitive adhesive composition is provided which comprises at least one pressure-sensitive adhesive polymer which is formed from
 (i) 50-95 wt % of 2-ethylhexyl acrylate,
 (ii) 1-25 wt % of at least one monomer selected from C1 to C2 alkyl (meth)acrylates,
 (iii) 1-10 wt % of styrene,
 (iv) 0.1-5 wt % of at least one ethylenically unsaturated acid or at least one ethylenically unsaturated acid anhydride,
 (v) 0 to 10 wt % of further ethylenically unsaturated compounds different from the monomers (i) to (iv), the amount figures of the monomers being based in each case on the total amount of monomers,
 and the polymerization of the monomers taking place in the presence of at least 0.01 part by weight of chain transfer agent per 100 parts by weight of monomers;
(2) the pressure-sensitive adhesive composition is applied to a substrate; and
(3) the substrate is applied to a surface whose surface temperature is lower than the dewpoint temperature of the air in contact with the surface.

The wt % figures are based in each case on the sum total of all monomers used in the polymerization.

The invention also provides the pressure-sensitive adhesive composition which can be used in the method of the invention.

A pressure-sensitive adhesive is a viscoelastic adhesive whose set film at room temperature (20° C.) remains permanently tacky and adhesive in the dry state. Adhesion to substrates is accomplished immediately under gentle applied pressure.

In the text below, the designation "(meth)acryl . . . " and similar designations are occasionally used as an abbreviated notation for "acryl . . . or methacryl . . . ". In the notation Cx alkyl (meth)acrylate and similar designations, x denotes the number of C atoms in the alkyl group.

Cold surfaces are surfaces having a surface temperature of in particular at least 10° C. below the ambient temperature. Damp surfaces are surfaces on which there is moisture in the form, for example, of water droplets or in the form of a water film. Cold and damp surfaces are surfaces whose surface temperature is lower than the dewpoint temperature of the (moist) air in contact with the surface and on which consequently moisture (in the form of water droplets or in the form of a water film, for example) has deposited. The surface temperature here is preferably less than 20° C., less than 10° C., or less than 0° C., and preferably at least 10° C. lower than the ambient temperature. The relative humidity of the ambient air is preferably at least 40% or at least 50%.

Principal monomer is 2-ethylhexyl acrylate, which is used in an amount of 50-95 wt %, preferably of 60-90 wt % or of 70-90 wt %.

Used as monomer (ii) is 1-25 wt %, preferably 5-25 wt % or 10-25 wt %, of at least one monomer selected from C1 to C2 alkyl (meth)acrylates. The monomers (ii) are preferably methyl acrylate, methyl methacrylate, ethyl acrylate or a mixture thereof, with particular preference being given to ethyl acrylate alone or in a mixture with methyl methacrylate.

The weight amount ratio of 2-ethylhexyl acrylate to monomers (ii), more particularly the weight amount ratio of 2-ethylhexyl acrylate to ethyl acrylate, is preferably from 2:1 to 8:1.

Styrene is used in an amount of 1-10 wt %, preferably of 1.5 to 8 wt % or of 1.5 to 5 wt %. The weight amount ratio of 2-ethylhexyl acrylate to styrene is preferably from 20:1 to 50:1.

Ethylenically unsaturated acids or ethylenically unsaturated acid anhydrides (acid monomers iv) are used in an amount of 0.1-5 wt %, preferably of 0.2-3 wt %. Suitable, for example, are monomers with carboxylic, sulfonic or phosphonic acid groups. Preferred are carboxylic acid groups. Mention may be made of acrylic acid, methacrylic acid, itaconic acid, maleic acid or fumaric acid, for example. The acid groups may be present in the form of their salts. Particularly preferred are acrylic acid and methacrylic acid.

The adhesive polymer may be synthesized from further monomers (v). The further monomers (v), different from the monomers (i) to (iv), are copolymerizable, ethylenically unsaturated compounds. They can be used in amounts of 0 to 10 wt %, preferably of 0.1-8 wt %. The further monomers (v) are preferably selected from the group consisting of C3 to C20 alkyl (meth)acrylates other than 2-ethylhexyl acrylate, vinyl esters of carboxylic acids comprising up to 20 C atoms, vinyl aromatics other than styrene having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, monomers comprising hydroxyl groups, especially $C_1$-$C_{10}$ hydroxyalkyl (meth)acrylates, (meth)acrylamide, or mixtures of these monomers. Further monomers that may be mentioned are, additionally, phenyloxyethyl glycol mono (meth)acrylate, glycidyl (meth)acrylate, aminoalkyl (meth) acrylates such as 2-aminoethyl (meth)acrylate, for example. Alkyl groups have preferably from 1 to 20 C atoms. $C_1$-$C_{20}$ Alkyl (meth)acrylates have 1-20 C atoms in the alkyl groups. $C_1$-$C_{10}$ Hydroxyalkyl (meth)acrylates have 1-10 C atoms in the hydroxyalkyl groups. Further monomers that may be mentioned also include crosslinking monomers.

Suitable monomers are, for example, (meth)acrylic acid alkyl esters with a $C_3$-$C_{10}$ alkyl radical. Also suitable in particular are mixtures of the (meth)acrylic acid alkyl esters. Vinyl esters of carboxylic acids having 1 to 20 C atoms are, for example, vinyl acetate, vinyl laurate, vinyl stearate, vinyl propionate, and vinyl esters of Versatic acid. Vinyl aromatic compounds contemplated include vinyltoluene, alpha- and p-methylstyrene, alpha-butylstyrene, 4-n-butylstyrene, 4-n-decylstyrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Preferred vinyl ethers are those of alcohols comprising 1 to 4 C atoms. Suitable hydrocarbons having 4 to 8 C atoms and two olefinic double bonds are butadiene, isoprene, and chloroprene, for example.

Preferred further monomers (v) are $C_3$ to $C_{10}$ alkyl acrylates and $C_3$ to $C_{10}$ alkyl methacrylates, more particularly $C_3$ to $C_8$ alkyl acrylates and $C_3$ to $C_8$ alkyl methacrylates, and vinyl esters, especially vinyl acetate, and mixtures thereof, and also C2 to C10 hydroxyalkyl (meth)acrylates. Especially preferred are n-hexyl acrylate, octyl acrylate, vinyl acetate, and hydroxypropyl acrylate, and also mixtures of these monomers.

The further monomers are used in general in minor amounts; their proportion overall is preferably below 10 wt %, more particularly below 8 wt %.

In one embodiment the pressure-sensitive adhesive polymer is formed from
(i) 70-90 wt % of 2-ethylhexyl acrylate,
(ii) 10-25 wt % of at least one monomer selected from ethyl acrylate, methyl acrylate, and methyl methacrylate,
(iii) 1-10 wt % of styrene,
(iv) 0.2-3 wt % of at least one ethylenically unsaturated acid selected from acrylic acid, methacrylic acid, and a mixture thereof, and
(v) 0 to 10 wt % of other ethylenically unsaturated compounds different from the monomers (i) to (iv).

In one embodiment the pressure-sensitive adhesive polymer is formed from
(i) 70-90 wt % of 2-ethylhexyl acrylate,
(ii) 10-25 wt % of ethyl acrylate or a mixture of ethyl acrylate with methyl acrylate and/or methyl methacrylate,
(iii) 1-8 wt % of styrene,
(iv) 0.2-3 wt % of at least one ethylenically unsaturated acid selected from acrylic acid, methacrylic acid, and a mixture thereof, and
(v) 0 to 10 wt % or 0.1 to 10 wt % of vinyl acetate.

The adhesive polymers of the invention are obtainable by radical polymerization of ethylenically unsaturated compounds (monomers). The polymers are prepared preferably by emulsion polymerization, and are therefore preferably emulsion polymers. The invention, accordingly, also provides pressure-sensitive adhesive dispersions comprising a pressure-sensitive adhesive polymer of the invention, prepared by emulsion polymerization, in dispersion in water.

In the emulsion polymerization, ethylenically unsaturated compounds (monomers) are polymerized in water, with use of ionic and/or nonionic emulsifiers and/or protective colloids or stabilizers as surface-active compounds for stabilizing the monomer droplets and the polymer particles subsequently formed from the monomers. The surface-active substances are used customarily in amounts of 0.1 to 10 parts by weight, preferably 0.2 to 5 parts by weight, based on 100 parts by weight of the monomers to be polymerized.

A comprehensive description of suitable protective colloids is found in Houben-Weyl, Methoden der organischen Chemie, volume XIV/1, Makromolekulare Stoffe [macromolecular compounds], Georg-Thieme-Verlag, Stuttgart, 1961, pp. 411 to 420. Emulsifiers contemplated include anionic, cationic, and nonionic emulsifiers. Surface-active substances used are preferably emulsifiers, whose molecular weights, in contrast to those of the protective colloids, are customarily below 2000 g/mol. Where mixtures of surface-active substances are used, the individual components must of course be compatible with one another, something which in case of doubt can be checked using a few preliminary tests. Surface-active substances used are preferably anionic and nonionic emulsifiers. Common accompanying emulsifiers are, for example, ethoxylated fatty alcohols (EO degree: 3 to 50, alkyl radical: $C_8$ to $C_{36}$), ethoxylated mono-, di-, and trialkylphenols (EO degree: 3 to 50, alkyl radical: $C_4$ to $C_9$), alkali metal salts of dialkyl esters of sulfosuccinic acid, and also alkali metal salts and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$), and of alkylarylsulfonic acids (alkyl radical: $C_9$ to $C_{18}$).

Further suitable emulsifiers are compounds of the general formula

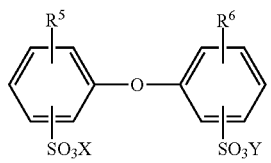

in which R5 and R6 are hydrogen or C4 to C14 alkyl and not simultaneously hydrogen, and X and Y may be alkali metal ions and/or ammonium ions. Preferably, R5 and R6 are linear or branched alkyl radicals having 6 to 18 C atoms or hydrogen, and in particular having 6, 12, and 16 C atoms, with R5 and R6 not both simultaneously being hydrogen. X and Y are preferably sodium, potassium, or ammonium ions, with sodium being particularly preferred. Particularly advantageous compounds are those in which X and Y are sodium, R5 is a branched alkyl radical having 12 C atoms, and R6 is hydrogen or R5. Use is frequently made of technical mixtures having a fraction of 50 to 90 wt % of the monoalkylated product. Commercial products of suitable emulsifiers are, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. For the present invention, ionic emulsifiers or protective colloids are preferred. With particular preference they are ionic emulsifiers, more particularly salts and acids, such as carboxylic acids, sulfonic acids, and sulfates, sulfonates or carboxylates. In particular, use may also be made of mixtures of ionic and nonionic emulsifiers.

The emulsion polymerization may be started using water-soluble initiators. Water-soluble initiators are, for example, ammonium salts and alkali metal salts of peroxo-disulfuric acid, sodium peroxodisulfate for example, hydrogen peroxide, or organic peroxides, tert-butyl hydroperoxide for example. Other suitable initiators include those called reduction-oxidation (redox) initiator systems. The redox initiator systems consist of at least one, usually inorganic reducing agent and an organic or inorganic oxidizing agent. The oxidizing component comprises, for example, the initiators already stated above for the emulsion polymerization. The reducing components comprise, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may be used along with soluble metal compounds whose metallic component is able to exist in a plurality of valence states. Examples of customary redox initiator systems include ascorbic acid/iron (II) sulfate/sodium peroxidisulfate, tert-butyl hydroperoxide/sodium disulfite, tert-butyl hydroperoxide/Na hydroxymethanesulfinic acid. The individual components, the reducing component for example, may also be mixtures, an example being a mixture of the sodium salt of hydroxymethanesulfinic acid and sodium disulfite.

The stated initiators are used usually in the form of aqueous solutions, with the lower concentration being determined by the amount of water that is acceptable in the dispersion, and the upper concentration by the solubility of the respective compound in water. Generally speaking, the concentration of the initiators is 0.1 to 30 wt %, preferably 0.5 to 20 wt %, more preferably 1.0 to 10 wt %, based on the monomers to be polymerized. It is also possible for a plurality of different initiators to be used in the emulsion polymerization.

In the polymerization, chain transfer agents are used in amounts of at least 0.01 part by weight of chain transfer agent per 100 parts by weight of monomers, e.g., from 0.01 to 0.8 part by weight, or from 0.01 to 0.1 part by weight, per 100 parts by weight of the monomers to be polymerized. Using these agents, through a chain termination reaction, the molar mass of the emulsion polymer can be controlled or reduced. These agents are bonded to the polymer in the process, generally to the chain end.

Suitable chain transfer agents are, for example, organic compounds containing sulfur in bonded form (e.g., compounds with a thiol group), aliphatic and/or araliphatic halogen compounds, aliphatic and/or aromatic aldehydes, unsaturated fatty acids (e.g., oleic acid), dienes having nonconjugated double bonds (such as divinylmethane, terpinolene, or vinylcyclohexene, for example), hydrocarbons having readily abstractable hydrogen atoms (such as toluene, for example), organic acids and/or their salts (such as formic acid, sodium formate, ammonium formate, for example), alcohols (such as isopropanol, for example), and phosphorus compounds (such as sodium hypophosphite, for example). Also possible, however, is the use of mixtures of mutually nondisrupting chain transfer agents as stated above. The chain transfer agents are generally low molecular mass compounds with a molar weight of less than 2000, more particularly of less than 1000 g/mol. It is advantageous to supply a portion or the entirety of the chain transfer agents to the aqueous reaction medium before the radical polymerization is initiated. Furthermore, a portion or the entirety of the radical chain transfer compound may also be advantageously supplied to the aqueous reaction medium together with the monomers, during the polymerization.

Organic compounds having a thiol group are, for example, primary, secondary or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as, for example, 2-hydroxy-ethanethiol, aromatic thiols, such as benzenethiol, ortho-, meta-, or para-methyl-benzenethiol, mercaptoalkyl esters of, for example, C2 to C4 carboxylic acids, having 1 to 18 C atoms in the alkyl group, as for example 2-mercaptoethyl propionate, and also all further sulfur compounds described in Polymer Handbook, 3rd edition, 1989, J. Brandrup and E. H. Immergut, John Wiley & Sons, Section II, pages 133 to 141. Preferred organic compounds comprising sulfur in bonded form are, in particular, tert.-butyl mercaptan, ethyl thioglycolate, mercaptoethanol, mercaptopropyltrimethoxysilane, tert-dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercapto-propanol, 3-mercaptopropane-1,2-diol, 1,4-mercaptobutanol, thioglycolic acid, 3-mercaptopropionic acid, mercaptosuccinic acid, thioacetic acid, and thiourea. Particularly preferred thio compounds are tert.-butyl mercaptan, ethyl thioglycolate, mercaptoethanol, mercaptopropyltrimethoxysilane or tert-dodecyl mercaptan.

Aliphatic and/or araliphatic halogen compounds are, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide. Aliphatic and/or aromatic aldehydes are, for example, formaldehyde, acetaldehyde, propionaldehyde and/or benzaldehyde.

The emulsion polymerization takes place in general at 30 to 130° C., preferably at 50 to 90° C. The polymerization medium may consist either of water alone or else of mixtures of water and liquids miscible therewith such as methanol. Preference is given to using water alone. The emulsion polymerization may be carried out either as a batch operation or in the form of a feed process, including staged or gradient regimes. The feed process is preferred, in which a portion of the polymerization batch is introduced as an initial charge, and is heated to the polymerization temperature and its polymerization commenced, and then the remainder of the polymerization batch is supplied to the polymerization zone, customarily via a plurality of spatially separate feeds, of which one or more comprise the monomers in pure form or in emulsified form, this supply taking place continuously, in stages, or subject to a concentration gradient, with the polymerization being maintained. In the polymerization it is also possible for a polymer seed to be included in the initial charge, for the purpose of more effective setting of the particle size, for example.

The manner in which the initiator is added to the polymerization vessel in the course of the radical aqueous emulsion polymerization is known to a person of ordinary skill in the art. It may both be included in its entirety in the initial charge to the polymerization vessel, or introduced continuously or in stages at the rate at which it is consumed in the course of the radical aqueous emulsion polymerization. Individually, this is dependent on the chemical nature of the initiator system and also on the polymerization temperature. Preference is given to including part in the initial charge and supplying the remainder to the polymerization zone at the rate at which it is consumed. In order to remove the residual monomers, it is customary to add initiator after the end of the actual emulsion polymerization as well, i.e., after a monomer conversion of at least 95%. In the case of the feed process, the individual components may be added to the reactor from above, at the side, or from below, through the reactor bottom.

In the emulsion polymerization, aqueous dispersions of the polymer with solids contents generally of 15 to 75 wt %, preferably of 40 to 75 wt %, are obtained. For a high space/time yield of the reactor, dispersions with an extremely high solids content are preferred. In order to be able to achieve solids contents >60 wt %, a bimodal or polymodal particle size ought to be established, since otherwise the viscosity becomes too high and the dispersion can no longer be managed. Producing a new generation of particles can be accomplished, for example, by adding seed (EP 81083), by adding excess amounts of emulsifier, or by adding miniemulsions. Another advantage associated with the combination of low viscosity and high solids content is the improved coating characteristics at high solids contents. Producing one or more new generations of particles is something which can be done at any point in time. This time is guided by the particle size distribution that is desired for a low viscosity.

The polymer thus prepared is used preferably in the form of its aqueous dispersion. The size distribution of the dispersion particles may be monomodal, bimodal or multimodal. By average particle size here is meant the $d_{50}$ of the particle size distribution, meaning that 50 wt % of the total mass of all particles have a particle diameter smaller than the $d_{50}$. The particle size distribution can be determined in a known way using an analytical ultracentrifuge (W. Mächtle, Makromolekulare Chemie 185 (1984), pp. 1025-1039). In the case of bimodal or multimodal particle size distribution, the particle size may be up to 1000 nm. The pH of the polymer dispersion is set preferably at a pH greater than 4.5, more particularly at a pH of between 5 and 8. The glass transition temperature of the pressure-sensitive adhesive polymer is preferably less than 0° C., more preferably −60 to −10° C., and very preferably −60 to −20° C. The glass transition temperature may be determined by means of differential scanning calorimetry (e.g., ASTM 3418/82, midpoint temperature).

A pressure-sensitive adhesive composition of the invention comprises the pressure-sensitive adhesive polymers preferably in the form of the aqueous polymer dispersion as obtainable or obtained by the emulsion polymerization. The pressure-sensitive adhesive compositions may consist solely of the polymers or of the aqueous dispersion of the polymers. Alternatively, the PSA may include further adjuvants as well, examples being fillers, dyes, flow control agents, thickeners, preferably associative thickeners, defoamers, crosslinkers, plasticizers, pigments, wetting agents, or tackifiers (tackifying resins). Tackifiers are known, for example, from Adhesive Age, July 1987, pages 19-23 or Polym. Mater. Sci. Eng. 61 (1989), pages 588-592. For more effective wetting of surfaces, the PSAs may comprise, in particular, wetting assistants (wetting agents), examples being fatty alcohol ethoxylates, alkylphenol ethoxylates, nonylphenol ethoxylates, polyoxyethylenes/propylenes, or sodium dodecylsulfonates. The amount of adjuvants is generally 0.05 to 5 parts by weight, more particularly 0.1 to 3 parts by weight, per 100 parts by weight of polymer (solid).

The pressure-sensitive adhesive composition preferably comprises
60-95 parts by weight of pressure-sensitive adhesive polymer,
5-40 parts by weight of tackifier, and
optionally 0-10 parts by weight of further constituents such as, for example, the aforementioned wetting agents, thickeners, defoamers, crosslinkers, etc.

A tackifier is a polymeric or oligomeric adjuvant for adhesive polymers or, generally, for elastomers, which increases their autoadhesion (tack, inherent stickiness, self-adhesion), meaning that they adhere firmly to surfaces after brief, gentle applied pressure. Tackifiers are, for example, natural resins, such as rosins, and their derivatives formed by disproportionation or isomerization, polymerization, dimerization and/or hydrogenation, or terpene resins. They may be present in their salt form (with, for example, monovalent or polyvalent counterions (cations)) or, preferably, in their esterified form. Alcohols used for the esterification may be monohydric or polyhydric. Examples are methanol, ethanediol, diethylene glycol, triethylene glycol, 1,2,3-propanetriol, and pentaerythritol. Also used, furthermore, are hydrocarbon resins, examples being coumaroneindene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, and vinyltoluene.

Also being used increasingly as tackifiers are polyacrylates which have a low molar weight. These polyacrylates preferably have a weight-average molecular weight $M_w$ below 50,000, more particularly below 30,000. The polyacrylates consist preferably to an extent of at least 60 wt %, more particularly at least 80 wt %, of $C_1$-$C_8$ alkyl (meth) acrylates. Suitability is possessed, for example, by the low molecular mass polymers and oligomers described in WO 2013/117428, having a weight-average molecular weight of less than 50,000 and a glass transition temperature of greater than or equal to −40° C. to less than or equal to 0° C., preferably of greater than or equal to −35° C. to less than or equal to 0° C., preparable by emulsion polymerization in the presence of at least one chain transfer agent and preparable from a monomer mixture comprising at least 40 wt % of at least one C1 to C20 alkyl (meth)acrylate.

Preferred tackifiers are natural or chemically modified rosins. Rosins consist predominantly of abietic acid or derivatives of abietic acid. The tackifiers can be added simply to the polymer dispersion. In this case the tackifiers themselves are preferably in the form of an aqueous dispersion. The amount by weight of the tackifiers is preferably 5 to 100 parts by weight, more preferably 10 to 50 parts by weight, based on 100 parts by weight of polymer (solid/solid).

The pressure-sensitive adhesive polymer and the pressure-sensitive adhesive dispersion may be used for producing self-adhesive articles. The articles are coated at least partly with the PSA. After they have been bonded, the self-adhesive articles are preferably removable. The self-adhesive articles may be, for example, sheets, tapes or labels. Suitable backing materials are paper, polymeric films, and metal foils, for example. Self-adhesive tapes of the invention may be single or double sidedly coated tapes comprising the above substances. Particularly preferred are self-adhesive labels. Self-adhesive labels of the invention may be labels of paper or of a thermoplastic film. Thermoplastic films contemplated include, for example, films of polyolefins (e.g., polyethylene, polypropylene), polyolefin copolymers, films of polyesters (e.g., polyethylene terephthalate) or polyacetate. The surfaces of the thermoplastic polymer films are preferably corona treated. The labels are coated single sidedly with adhesive.

Preferred substrates for the self-adhesive articles are paper and polymer films. Particularly preferred self-adhesive articles are paper labels.

The self-adhesive articles are coated on at least one surface, at least partly, with a PSA of the invention. The adhesive may be applied to the articles by customary techniques such as rolling, knife coating or spreading. The coat weight is preferably 0.1 to 30 g, more preferably 2 to 20 g, of solids per $m^2$. Following application, there is generally a drying step for removing the water and/or the solvents. The water may be removed by drying at 50 to 150° C., for example. The coated substrates obtained accordingly are used, for example, as self-adhesive articles, such as labels, adhesive tapes or sheets. For this purpose, before or after the adhesive has been applied, the backings may be slit to form adhesive tapes, labels or sheets. For subsequent use, the PSA-coated side of the substrates may be lined with a release paper, such as with a siliconized paper, for example.

The substrates to which the self-adhesive articles may be advantageously applied may comprise, for example, metal, wood, glass, paper or plastic. The self-adhesive articles are suitable in particular for bonding on packaging surfaces, cartons, plastic packaging, books, windows, motor vehicle bodies or bodywork parts. Preferred substrates are self-adhesive labels, more particularly self-adhesive paper labels and self-adhesive film labels. The backing material is paper or polymer film and has a first surface and a second surface, with the first surface being self-adhesive and being at least partly coated with a PSA of the invention, while the second surface may be printed, or the second surface or the label may be at least partly colored. Coloring may have been brought about, for example, by a colored coating with pigments or dyes, by colored printing or, in thermal papers, by exposure to heat.

The invention also relates to the use of the above-described pressure-sensitive adhesive compositions for the bonding of substrates to cold and damp surfaces. The substrates are preferably self-adhesive labels, more particularly self-adhesive paper or film labels.

EXAMPLES

Abbreviations used are as follows:
EHA: 2-Ethylhexyl acrylate
EA: Ethyl acrylate
BA: n-Butyl acrylate
MA Methyl acrylate
MMA Methyl methacrylate
VAc: Vinyl acetate
S: Styrene
AA: Acrylic acid
t-DMC tert-Dodecyl mercaptan Emulsion polymers are used that are prepared from the monomers stated in table 1. The amount figures are parts by weight. Examples V1 to V5 are comparative examples.

TABLE 1

Emulsion polymers

| Example | EHA | BA | EA | MA | MMA | VAc | AA | S | t-DMC |
|---|---|---|---|---|---|---|---|---|---|
| A | 85 | 0 | 12 | 0 | 0 | 0 | 1 | 2 | 0.03 |
| V1 | 0 | 85 | 0 | 0 | 12 | 0 | 1 | 2 | 0 |
| V2 | 0 | 85 | 0 | 0 | 12 | 0 | 1 | 2 | 0.03 |
| B | 74 | 0 | 23 | 0 | 0 | 0 | 1 | 2 | 0.03 |
| V3 | 85 | 0 | 0 | 0 | 12 | 0 | 1 | 2 | 0 |
| C | 76 | 0 | 12 | 0 | 9 | 0 | 1 | 2 | 0.03 |
| V4 | 85 | 0 | 12 | 0 | 2 | 0 | 1 | 0 | 0.04 |
| V5 | 72 | 0 | 0 | 20 | 0 | 5 | 1 | 2 | 0 |
| D | 85 | 0 | 0 | 12 | 0 | 0 | 1 | 2 | 0.05 |
| E | 80 | | 12 | | | 5 | 1 | 2 | 0.04 |

Performance Testing
Quickstick on Cold and Damp Surfaces

In the determination of the Quickstick (surface tack, also called loop tack), a determination is made, generally, of the force with which an adhesive applied to a carrier material by bonding without pressure onto a substrate opposes removal from the substrate at a defined removal speed. The determination of the Quickstick on cold & damp surfaces represents an adapted test method along the lines of FTM 1 (FINAT Test Method 1). Carrier material is label paper, 75 g/$m^2$; test substrate is HDPE (High Density Polyethylene). The polymer dispersions under test are first adjusted to a pH of 6.5 with sodium hydroxide (10 wt % solution) and admixed with 0.5% of Lumiten® I-SC (emulsifier; 56 wt % solution). The adhesive formulations are aged at room temperature for at least 16 hours. Subsequently, in a transfer coating process, corresponding laminates with an adhesive coat weight of 20 g/m² are produced. From the adhesive-coated carrier, a test strip 25 mm wide and 250 mm long is cut, and is stored under standard conditions (23° C., 50% relative humidity) for at least 16 hours. The two ends of the test strip are folded over for a length of approximately 1 cm with the adhesive side inward. A loop is formed from the adhesive strip, with the adhesive side outward, and the two ends are brought together and clamped into the upper jaw of a tensile testing machine. The test substrate mount is clamped into the lower jaw. The HDPE test substrate is stored in a deep-freeze chest at −5° C. for at least 1 hour. The cooled test substrate is removed and inserted immediately into the test substrate mount of the tensile testing machine, which is in a room subject to standard conditions (23° C., 50% relative humidity). Under the conditions described, a fine condensation film of water forms on the cold HDPE surface. 15 seconds after removal from the deep-freeze chest, the Quickstick test cycle is commenced. The adhesive strip loop is moved downward by the tensile testing machine at a speed of 300 mm/minute, and so the adhesive side of the test strip bonds to the substrate without additional pressure. The tensile testing machine is halted and is immediately moved upward again when the bottom edge of the upper jaw is 40 mm above the substrate. The test result is reported in N/25 mm width. The maximum value on the display (Fmax) is read off as the measure of the surface tack. An average is formed from three individual results.

TABLE 2

Test results

| Example | Quickstick cold & damp [N/25 mm] |
|---|---|
| A | 6.5 |
| V1 | 0.2 |
| V2 | 0.2 |
| B | 4.6 |
| V3 | 1.2 |
| C | 6.0 |
| V4 | 2.0 |
| V5 | 1.2 |
| D | 5.5 |
| E | 4.6 |

Inventive examples A to E show significantly increased Quickstick values as compared with examples with n-butyl acrylate (V1, V2), with examples without chain transfer agent (V3, V5), and with examples without styrene (V4).

What is claimed is:

1. A method for bonding a substrate to a surface, the method comprising
    applying a pressure-sensitive adhesive composition to a substrate, wherein the composition comprises at least one pressure-sensitive adhesive polymer which is formed from
    (i) 50-95 wt % of 2-ethylhexyl acrylate,
    (ii) 1-25 wt % of at least one C1 to C2 alkyl (meth) acrylate,
    (iii) 1-10 wt % of styrene,
    (v) 0.1-5 wt % of at least one ethylenically unsaturated acid or at least one ethylenically unsaturated acid anhydride, and
    (v) 0 to 10 wt % of an ethylenically unsaturated compounds different from monomers (i) to (iv),
    based on a total amount of monomers (i) to (v),
    in the presence of at least 0.01 part by weight of a chain transfer agent per 100 parts by weight of the monomers (i) to (v); and
    applying the substrate to a surface whose surface temperature is lower than a dewpoint temperature of air in contact with the surface,
    wherein the pressure-sensitive adhesive polymer is not formed from a monomer comprising a hydroxyl group.

2. The method according to claim 1, wherein the substrate is a self-adhesive label.

3. The method according to claim 2, wherein the label is a self-adhesive paper or film label.

4. The method according to claim 1, wherein the surface temperature is at least 5° C. lower than the dewpoint temperature of the air in contact with the surface.

5. The method according to claim 1, wherein the pressure-sensitive adhesive composition comprises
    60-95 parts by weight of the pressure-sensitive adhesive polymer and
    5-40 parts by weight of a tackifier.

6. A pressure-sensitive adhesive composition, which is an aqueous polymer dispersion and comprises at least one pressure-sensitive adhesive polymer which is formed from
    (i) 50-95 wt % of 2-ethylhexyl acrylate,
    (ii) 1-25 wt % of at least one C1 to C2 alkyl (meth) acrylate,
    (iii) 1-10 wt % of styrene,
    (iv) 0.1-5 wt % of at least one ethylenically unsaturated acid or at least one ethylenically unsaturated acid anhydride, and
    (v) 0 to 10 wt % of an ethylenically unsaturated compounds different from monomers (i) to (iv),
    based on a total amount of monomers (i) to (v),
    in the presence of at least 0.01 part by weight of a chain transfer agent per 100 parts by weight of the monomers (i) to (v),
    wherein the pressure-sensitive adhesive polymer is not formed from a monomer comprising a hydroxyl group.

7. The pressure-sensitive adhesive composition according to claim 6, wherein a weight ratio of 2-ethylhexyl acrylate (i) to the monomer (ii) is from 2:1 to 8:1.

8. The pressure-sensitive adhesive composition according to claim 6, wherein the pressure-sensitive adhesive polymer is formed from
    (i) 70-90 wt % of 2-ethylhexyl acrylate,
    (ii) 10-25 wt % of at least one monomer selected from the group consisting of ethyl acrylate, methyl acrylate, and methyl methacrylate,
    (iii) 1-10 wt % of styrene,
    (iv) 0.2-3 wt % of at least one ethylenically unsaturated acid selected from the group consisting of acrylic acid and methacrylic acid, and
    (v) 0 to 10 wt % of the ethylenically unsaturated compounds different from the monomers (i) to (iv).

9. The pressure-sensitive adhesive composition according to claim 6, wherein the ethylenically unsaturated compound (v) is at least one selected from the group consisting of a C3 to C20 alkyl (meth)acrylate other than 2-ethylhexyl acrylate, a vinyl ester of a carboxylic acid comprising up to 20 C atoms, a vinyl aromatic other than styrene comprising up to 20 C atoms, an ethylenically unsaturated nitrile, a vinyl halide, a vinyl ether of an alcohol comprising 1 to 10 C atoms, and an aliphatic hydrocarbon comprising 2 to 8 C atoms and one or two double bonds.

10. The pressure-sensitive adhesive composition according to claim 6, wherein the pressure-sensitive adhesive composition comprises
   60-95 parts by weight of the pressure-sensitive adhesive polymer and
   5-40 parts by weight of a tackifier.

* * * * *

UNITED STATES PATENT AND TRADEMARK OFFICE
CERTIFICATE OF CORRECTION

PATENT NO. : 9,976,060 B2  
APPLICATION NO. : 15/322955  
DATED : May 22, 2018  
INVENTOR(S) : Joerg-Alexander Dimmer et al.

Page 1 of 1

It is certified that error appears in the above-identified patent and that said Letters Patent is hereby corrected as shown below:

In the Claims

Column 11, Line 63, "(v)" should read --(iv)--.

Signed and Sealed this  
Twenty-eighth Day of April, 2020

Andrei Iancu  
*Director of the United States Patent and Trademark Office*